(12) United States Patent
Okumura et al.

(10) Patent No.: US 10,775,201 B2
(45) Date of Patent: Sep. 15, 2020

(54) ROTARY ENCODER AND ABSOLUTE ANGULAR POSITION DETECTION METHOD THEREOF

(71) Applicant: NIDEC SANKYO CORPORATION, Suwa-gun Nagano (JP)

(72) Inventors: Hirokatsu Okumura, Suwa-gun Nagano (JP); Yutaka Saito, Suwa-gun Nagano (JP); Hitoshi Joko, Suwa-gun Nagano (JP)

(73) Assignee: NIDEC SANKYO CORPORATION, Suwa-Gun, Nagano (JP)

(*) Notice: Subject to any disclaimer, the term of this patent is extended or adjusted under 35 U.S.C. 154(b) by 215 days.

(21) Appl. No.: 15/896,500

(22) Filed: Feb. 14, 2018

(65) Prior Publication Data

US 2018/0231400 A1 Aug. 16, 2018

(30) Foreign Application Priority Data

Feb. 14, 2017 (JP) ................. 2017-024796

(51) Int. Cl.
*G01D 5/245* (2006.01)
*G01B 7/30* (2006.01)
*G01D 5/14* (2006.01)

(52) U.S. Cl.
CPC ............ *G01D 5/2451* (2013.01); *G01B 7/30* (2013.01); *G01D 5/2454* (2013.01); *G01D 5/145* (2013.01)

(58) Field of Classification Search
CPC ...... G01B 7/30; G01D 5/145; G01D 5/24476; G01D 5/24485; G01D 5/2449; G01D 5/24495; G01D 5/2451; G01D 5/2454

USPC ....................... 324/207.12, 207.25
See application file for complete search history.

(56) References Cited

U.S. PATENT DOCUMENTS

| 5,625,353 | A | * | 4/1997 | Katagiri | ................. | G01D 5/145 324/207.11 |
| 5,757,180 | A | * | 5/1998 | Chou | ..................... | G01D 5/145 324/207.2 |
| 6,498,409 | B1 | * | 12/2002 | Collier-Hallman | .... | G01D 5/145 310/68 B |
| 7,023,203 | B2 | * | 4/2006 | Miyashita | .............. | G01D 5/145 324/207.25 |
| 7,580,809 | B2 | * | 8/2009 | Takeuchi | ............... | G01D 5/145 702/150 |

(Continued)

FOREIGN PATENT DOCUMENTS

JP 5666886 B2 12/2014

*Primary Examiner* — Steven L Yeninas
(74) *Attorney, Agent, or Firm* — Cantor Colburn LLP

(57) ABSTRACT

A rotary encoder may include a first sensor unit comprising a first magnet, and a first magnetosensitive unit facing the first magnet; a second sensor unit comprising a second magnet, and a second magnetosensitive unit facing the second magnet; a circuit to generate pulses; a counter to count the pulses; a first arithmetic unit to calculate a first angle value based on an output of the first magnetosensitive unit; and a second arithmetic unit to calculate a second angle value based on an output of the second magnetosensitive unit. One of the first magnet and the first magnetosensitive unit is provided in the fixed body and the other is provided in the rotating body. One of the second magnet and the second magnetosensitive unit is provided in the fixed body and the other is provided in the rotating body.

11 Claims, 9 Drawing Sheets

(56) References Cited

U.S. PATENT DOCUMENTS

| | | | | |
|---|---|---|---|---|
| 8,552,715 B2 * | 10/2013 | Semineth | ............. | G01D 5/2451 |
| | | | | 324/207.25 |
| 8,803,510 B2 * | 8/2014 | Takahashi | ............ | G01D 5/2457 |
| | | | | 324/207.13 |
| 9,927,495 B2 * | 3/2018 | Kim | ................... | G01R 33/0017 |
| 10,393,499 B2 * | 8/2019 | Jeon | ..................... | H02K 11/215 |
| 2002/0143288 A1 * | 10/2002 | Larsen | .............. | A61M 5/31551 |
| | | | | 604/19 |
| 2013/0134967 A1 * | 5/2013 | Kaufmann | .............. | H02P 6/185 |
| | | | | 324/207.25 |
| 2014/0015384 A1 * | 1/2014 | Someya | ............... | G01D 5/2454 |
| | | | | 310/68 B |
| 2014/0176125 A1 * | 6/2014 | Friedrich | ........... | G01R 33/0023 |
| | | | | 324/207.2 |

\* cited by examiner

FIG. 2
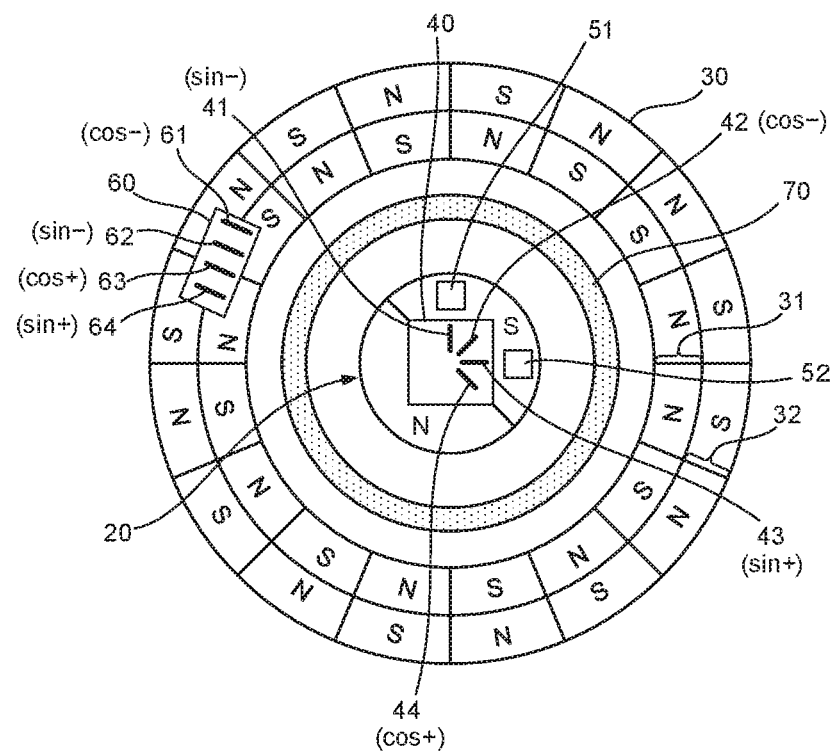
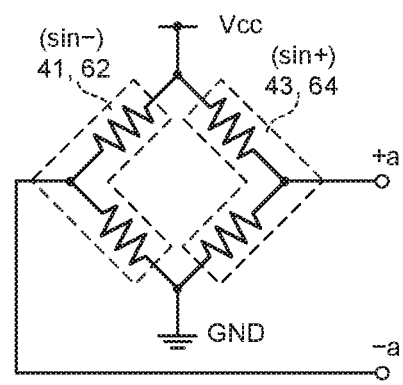
FIG. 3A
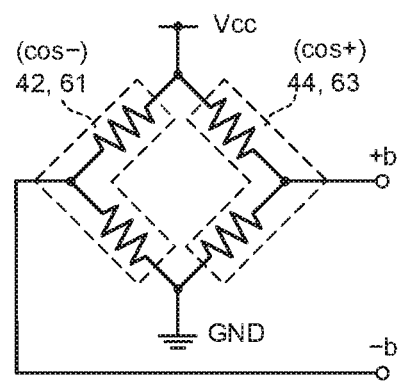
FIG. 3B

FIG. 10

|  |  | Lower 9 bits of multi-rotation absolute angular position data [4B] based on first sensor unit 1a (decimal notation) | | | | | | |
|---|---|---|---|---|---|---|---|---|
|  |  | 0 | 1 | 2 | ... | 509 | 510 | 511 |
| Upper 9 bits of one-rotation electrical angle data [5] of second sensor unit 1b (decimal notation) | 0 | 0 | 0 | 0 | ... | +1 | +1 | +1 |
|  | 1 | 0 | 0 | 0 | ... | +1 | +1 | +1 |
|  | 2 | 0 | 0 | 0 | ... | +1 | +1 | +1 |
|  | ⋮ | ⋮ | ⋮ | ⋮ | ⋱ | ⋮ | ⋮ | ⋮ |
|  | 509 | −1 | −1 | −1 | ... | 0 | 0 | 0 |
|  | 510 | −1 | −1 | −1 | ... | 0 | 0 | 0 |
|  | 511 | −1 | −1 | −1 | ... | 0 | 0 | 0 |

FIG. 11

|  |  | Lower 2 bits of QEP counter 86 [8] (decimal notation) | | | |
|---|---|---|---|---|---|
|  |  | 0 | 1 | 2 | 3 |
| Lower 2 bits of multi-rotation absolute angular position data [6A] based on second sensor unit 1b (decimal notation) | 0 | 0 | 0 | Error | −1 |
|  | 1 | 0 | 0 | 0 | Error |
|  | 2 | Error | 0 | 0 | 0 |
|  | 3 | +1 | Error | 0 | 0 |

FIG. 12

|  |  | Lower 2 bits of QEP counter 86 [9] (decimal notation) | | | |
|---|---|---|---|---|---|
|  |  | 0 | 1 | 2 | 3 |
| Upper 2 bits of one-rotation electrical angle data of second sensor unit 1b (decimal notation) | 0 | 0 | 0 | Error | +1 |
|  | 1 | 0 | 0 | 0 | Error |
|  | 2 | Error | 0 | 0 | 0 |
|  | 3 | −1 | Error | 0 | 0 |

ROTARY ENCODER AND ABSOLUTE ANGULAR POSITION DETECTION METHOD THEREOF

CROSS REFERENCE TO RELATED APPLICATION

The present application claims priority under 35 U.S.C. § 119 to Japanese Application No. 2017-024796 filed Feb. 14, 2017, the entire content of which is incorporated herein by reference.

TECHNICAL FIELD

At least an embodiment of the present invention relates to a magnetic rotary encoder for detecting an absolute angular position of a rotating body and an absolute angular position detection method in a magnetic rotary encoder.

BACKGROUND

As a rotary encoder for detecting an absolute angular position of a rotating body, a magnetic rotary encoder is known, in which a magnet is attached to a rotating body, a magnetic field generated by the magnet is detected by a magnetosensitive element (magnetic sensor) provided close to the rotating body, and a rotation angle is determined based on the fact that the intensity of a detected magnetic field changes in accordance with a rotation angle of a rotating body. As an example, a magnet with an N pole and an S pole magnetized in a circumferential direction is disposed on an end face of a rotation axis of a rotating body, and a magnetosensitive element having an output proportional to the magnitude of the magnetic field by this magnet is arranged on the extension of the rotation axis in a fixed body. As a magnetosensitive element, one capable of detecting the intensity of the magnetic field at two positions shifted by 45° from each other with respect to the rotation of the rotary shaft is used. Alternatively, in the case of using an element, like a Hall element, capable of detecting the intensity of the magnetic field including the direction of the magnetic field, a magnetosensitive element is disposed at a position shifted by 90° from each other with respect to the rotation of a rotation axis. Then, the magnetosensitive element provides outputs that change with a sine function (sin) and a cosine function (cos) against the rotation angle of the rotating body, and the rotation angle, that is, the absolute angular position of the rotating body can be obtained by calculating an angular position by arctangent ($\tan^{-1}$ or arctan) operation for the ratio of these outputs.

In order to increase the resolution of rotation angle detection in such a magnetic rotary encoder, Patent Document 1 discloses that when the magnet and the magnetosensitive element in the above configuration are provided respectively as a first magnet and a first magnetosensitive element, a second magnet disposed annularly around the rotation axis is provided on the rotating body, and a second magnetosensitive element for detecting the magnitude of the magnetic field generated by the second magnet is provided on the fixed body. In the second magnet, a plurality of pairs of N poles and S poles are magnetized alternately along the circumferential direction of the rotor. In other words, the plurality of N poles and the same number of S poles are alternately arranged in the circumferential direction of the rotor. The second magnetosensitive element is configured to be able to detect a magnitude of magnetization in each of positions spaced apart by a distance corresponding to a quarter of the circumferential length of a single pole of N pole or S pole, that is, a magnitude of a magnetic field due to the magnetization of the second magnet (in the case where it is possible to detect the intensity including the direction of the magnetic field, like the Hall element, a detection position interval is assumed to be half of the circumferential length of a single pole of N pole or S pole). In this configuration, when the rotating body rotates by an angle corresponding to the circumferential length of a single pole of N pole or S pole, the second magnetosensitive element outputs sine and cosine outputs similar to the sine and cosine outputs from the first magnetosensitive element when the rotor rotates once. Therefore, arctangent calculation is performed based on the output of the first magnetosensitive element to find which N pole or S pole of the second magnet the current rotation angle corresponds to, and then by performing arctangent calculation based on the output of the second magnetosensitive element, it is possible to detect a rotation angle with improved resolution according to the number of pairs of N pole and S pole in the second magnet. Further, in Patent Document 1, a plurality of pairs of N poles and S poles magnetized alternately along the circumferential direction of the rotor are used as a track, and a plurality of tracks are arranged in parallel in the radial direction of the rotor. In addition, it is disclosed that the detection accuracy of the angle of the rotating body is improved by configuring so that only the S pole of the other track is in contact with the N pole of one track between adjacent tracks. Assuming that there are two rows of tracks, this configuration can be said that the second magnet has a pair of N poles and S poles arranged in the radial direction of the rotor as a pole pair, and a plurality of pole pairs are annularly arranged so that the orientations of the N pole and S pole are opposite to each other between adjacent pole pairs.

CITATION LIST

Patent Document 1: Japanese Patent No. 5666886

In the rotary encoder having a first magnet and a second magnet disclosed in Patent Document 1, an absolute angular position of a rotating body can be obtained with high resolution, but in order to obtain the absolute angular position, it is necessary to perform A/D (analog/digital) conversion and arctangent calculation for each output of a first magnetosensitive element and a second magnetosensitive element. As a result, processing time and computation processing load increase. Further, when a relative positional deviation occurs between the first sensor unit including the first magnet and the first magnetosensitive element and the second sensor unit including the second magnet and the second magnetosensitive element, detection accuracy of absolute angular position also decreases.

SUMMARY

At least an embodiment of the present invention provides a rotary encoder capable of detecting an absolute angular position with high accuracy without increasing the processing time and without increasing the arithmetic processing load.

A rotary encoder of at least an embodiment of the present invention is a rotary encoder for detecting an angle of a rotating body relative to a fixed body, comprising a first sensor unit including a first magnet with a pair of N pole and S pole magnetized, and a first magnetosensitive unit facing the first magnet and detecting a component of phase A1 and a component of phase B1 different from the phase A1; a second sensor unit including a second magnet with a plurality of pairs of N poles and S poles alternately magnetized, and a second magnetosensitive unit facing the second magnet and detecting a component of phase A2 and a component of phase B2 different from the phase A2; a circuit for generating pulses for counting from an output of the second sensor unit; a counter for counting pulses; a first arithmetic unit for calculating a first angle value based on an output of the first magnetosensitive unit; and a second arithmetic unit for calculating a second angle value based on an output of the second magnetosensitive unit, wherein one of the first magnet and the first magnetosensitive unit is provided in the fixed body and the other is provided in the rotating body, one of the second magnet and the second magnetosensitive unit is provided in the fixed body and the other is provided in the rotating body, and wherein at the time of startup, first phase matching is performed for matching a phase between first multi-rotation absolute angular position data obtained from the first angle value and the second angle value, and the first multi-rotation absolute angular position data is concatenated to the second angle value, thereby generating second multi-rotation absolute angular position data, and second phase matching is performed for matching a phase of the second multi-rotation absolute position data based on a third angle value obtained by integrating the pulses for counting from the output of the second sensor unit, and third multi-rotation absolute angular position data is generated as an initial value, and after the startup, pulses is counted in the counter.

An absolute angular position detection method in a rotary encoder of at least an embodiment of the present invention, the rotary encoder comprising a first sensor unit and a second sensor unit, the first sensor unit includes a first magnet with a pair of N pole and S pole magnetized, and a first magnetosensitive unit facing the first magnet and detecting a component of phase A1 and a component of phase B1 different from the phase A1, and the second sensor unit includes a second magnet with a plurality of pairs of N poles and S poles alternately magnetized, and a second magnetosensitive unit facing the second magnet and detecting a component of phase A2 and a component of phase B2 different from the Phase A2, the rotary encoder further comprising a circuit for generating pulses for counting from an output of the second sensor unit; a counter for counting pulses; a first arithmetic unit for calculating a first angle value based on an output of the first magnetosensitive unit; and a second arithmetic unit for calculating a second angle value based on an output of the second magnetosensitive unit, wherein one of the first magnet and the first magnetosensitive unit is provided in the fixed body and the other is provided in the rotating body, and one of the second magnet and the second magnetosensitive unit is provided in the fixed body and the other is provided in the rotating body, the method of detecting an absolute angular position, the absolute angular position detection method comprising a step of performing, at startup, a first phase matching for matching a phase between first multi-rotation absolute angular position data obtained from the first angle value and the second angle value, and concatenating the first multi-rotation absolute angular position data and the second angle value, thereby generating second multi-rotation absolute angular position data; a step of performing second phase matching for matching a phase of the second multi-rotation absolute position data based on a third angle value obtained by integrating the pulses for counting from an output of the second sensor unit, and generating third multi-rotation absolute angular position data as an initial value; and a step of starting counting by the counter for the pulses for counting generated from an output of the second sensor unit after the startup.

According to at least an embodiment of the present invention as described above, angular position calculation is performed based on the outputs of the first sensor unit and the second sensor unit at the time of startup, and thereafter, the amount of movement is calculated based on the result (the number of accumulated pulses) obtained by counting pulses for counting. Compared with the angular position calculation requiring A/D conversion and arctangent calculation, the pulse counting can be executed in much shorter time and with a smaller processing load, thus, compared with performing the angular position calculation each time, the angular position can be obtained in a short time. Further, since the first and second positioning have been performed, it is possible to perform coupling between the data with high accuracy with respect to an angle, and it becomes possible to obtain the angular position with high accuracy.

In at least an embodiment of the present invention, at the time of startup, a value obtained by converting the third multi-rotation absolute angular position data into a value counted by the counter is stored in the counter as an initial value, and the counter may start counting from the stored value. In such a configuration, by referring to the value of the counter, it is possible to know an approximate multi-rotation absolute angular position after startup although the accuracy is coarse.

In at least an embodiment of the present invention, when an angular position is requested, third phase matching may be performed for matching a phase between a count value and second angle value in the counter at the time of the request, and the count value and the second angle value may be concatenated to generate fourth multi-rotation absolute angular position data. Alternatively, it is possible to execute a step of storing the value obtained by converting the third multi-rotation absolute angular position data into the value counted by the counter in the counter as an initial value at the time of startup. It is also possible to execute a step of performing third phase matching for matching a phase between the count value and second angle value in the counter at the time of the angular position request and concatenating the count value to the second angle value to generate fourth multi-rotation absolute angular position data. As a result, the counter may start counting from the stored value as a start value. In this configuration, the angular position calculation necessary for obtaining the high-resolution absolute angular position is performed after the calculation of the initial value only for the output of the second sensor unit when the angular position is requested. As a result, the processing time and the processing load can be reduced.

In at least an embodiment of the present invention, the third multi-rotation absolute angular position data may have a resolution corresponding to a quarter of the length of one cycle in the output of the second sensor unit. In this configuration, it is possible to improve the accuracy of the multi-rotation absolute angular position obtained with a rough accuracy in a short processing time.

In at least an embodiment of the present invention, a first magnetosensitive unit may include a magnetoresistive effect element having a magnetoresistive pattern corresponding to a phase A1 and a magnetoresistive pattern corresponding to a phase B1, and a magnetoresistive effect element having a pair of Hall elements disposed at positions spaced by 90° from the rotation axis of the rotating body. At the time of startup, preliminary phase matching may be performed for matching a phase between the first angle data and the Hall count multi-rotation data counted based on the combination of the polarities of the signals from a pair of Hall elements, and the Hall count multi-rotation data may be concatenated to the first angle value to obtain the first multi-rotation absolute angular position data. In this configuration, the multi-rotation data can be easily obtained by using the Hall element, regardless of the type of sensor used for the angular position calculation, and the accuracy of the multi-rotation data can be improved.

In at least an embodiment of the present invention, for example, the following method can be used for each phase matching described above. The preliminary phase matching can be performed by operating at least the least significant bit of the Hall count multi-rotation data to coincide with a quadrant of the rotation angle indicated in the first angle value, so that the lower 2 bits of the Hall count multi-rotation data represent a quadrant of the rotation angle of the rotating body. As the first phase matching, the bits of the first multi-rotation absolute angular position data may be compared with the bits of the second angle value in a range overlapping with respect to the rotation angle, the bits in the overlapping range may be removed from the first multi-rotation absolute angular position data, and correction may be made for the lower bits of the first multi-rotation absolute angular position data after the removal of the bits according to the result of the comparison. At this time, the second angle value is concatenated to the first multi-rotation absolute angular position data after the correction, and the second multi-rotation absolute angular position data is obtained. In the second phase matching, the lower 2 bits of the third angle value may represent a quadrant. As the third phase matching, the bits of the third multi-rotation absolute angular position data may be compared with the bits of the second angle value in a range overlapping with respect to the rotation angle, the bits in the overlapping range may be removed from the third multi-rotation absolute angular position data, and correction may be made for the lower bits of the third multi-rotation absolute angular position data after the removal of the bits according to the result of the comparison. At this time, the second angle value is concatenated to the third multi-rotation absolute angular position data after the correction, and the fourth multi-rotation absolute angular position data is obtained. Since these phase matching can be performed only by addition, subtraction, bit shifting and bit masking for each data represented by a binary value, it can be executed in a short processing time as compared with the case accompanied by multiplication and subtraction.

According to at least an embodiment of the present invention, in a rotary encoder, an absolute angular position can be detected with high accuracy without increasing a processing time and a processing load.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a plan view illustrating a layout of a magnet, a magnetosensitive element, and a Hall element.

FIG. 3A and FIG. 3B are an equivalent circuit diagram of a magnetosensitive element.

FIG. 10 is a diagram explaining a correction value table used in phase matching calculation B.

FIG. 11 is a diagram explaining a correction value table used in phase matching calculation C.

FIG. 12 is a diagram explaining a correction value table used in phase matching calculation D.

DETAILED DESCRIPTION

Figure 1:
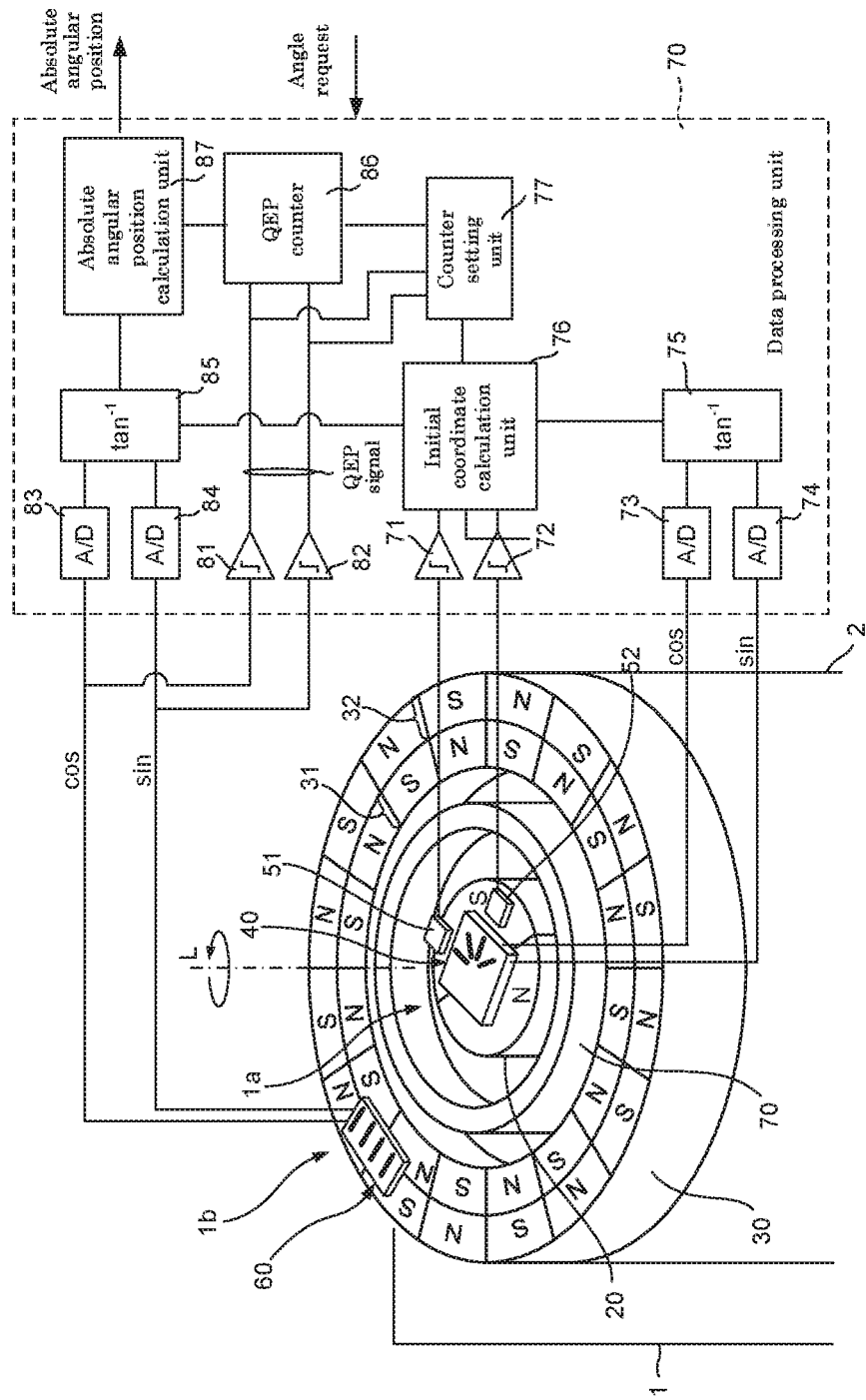
FIG. 1 is a diagram illustrating a rotary encoder according to one embodiment of the present invention.

Next, embodiments of the present invention will be described with reference to the drawings. FIG. 1 shows an overall structure used for determining a rotation angle of a rotary encoder according to one embodiment of the present invention. FIG. 2 shows an arrangement of a magnet, a magnetosensitive element, and a Hall element in the rotary encoder. As will be described later, the Hall element is provided for discriminating a quadrant of a rotation angle. The rotary encoder of the present embodiment is the same as that described in Patent Document 1 with respect to the appearance and mechanical structure, but different in a processing circuit for processing a signal output from a magnetosensitive element to determine an absolute angular position. Therefore, regarding the rotary encoder of the present embodiment, description of the appearance and the part to be attached to a measuring object will be omitted. In addition, the rotary encoder is configured as a multi-rotation rotary encoder capable of knowing the number of rotations of a rotating body from a predetermined origin position.

The rotary encoder includes a rotating body 2 connected to a rotation axis of a measuring object such as a motor, and a fixed body 1 being fixed without connecting to a rotation axis of a measuring object. A rotating body 2 is provided with a first magnet 20, a second magnet 30, and a shield member 70 provided between the first magnet 20 and the second magnet 30 for magnetically shielding between them. In FIG. 1, an axial direction of a rotation axis L of the rotating body 2 is indicated by a chain line. In FIG. 1, an axial direction of a rotation axis L of the rotating body 2 is indicated by a chain line. Signs of "N" and "S" attached to each of the magnets 20 and 30 indicate that the positions indicated by the signs are magnetized surfaces being magnetized in polarities indicated by the signs. A fixed body 1 is provided with a first magnetosensitive element 40 for detecting a magnitude of a magnetic field generated by the first magnet 20, first and second Hall elements 51, 52 for detecting a polarity of a magnetic field generated by the first magnet, and a second magnetosensitive element 60 for detecting a magnetic field generated by the second magnet 30. A first sensor unit 1a is composed of the first magnet 20, the first magnetosensitive element 40, and the first and second Hall elements 51, 52. A second sensor unit 1b is composed of the second magnet 30 and the second magnetosensitive element 60. A first magnetosensitive unit is composed of the first magnetosensitive element 40 and the first and second Hall elements 51, 52. A second magnetosensitive unit is composed of the second magnetosensitive element 60.

In the first sensor unit 1a, the first magnet 20 provided in the rotating body 2 has a magnetized surface with an N pole and an S pole polarized in a circumferential direction. The shape combining the magnetized surfaces of both the N pole and the S poles is almost circular, and the center thereof coincides with the rotation axis L. The first magnetosensitive element 40 provided in the fixed body 1 faces the magnetized surface of the first magnet 20. The first and second Hall elements 51 and 52 are provided corresponding to the magnetized surface of the first magnet 20 to be separated from each other by 90° as viewed from the rotation axis. The first magnetosensitive element 40 is constituted by, for example, a magnetoresistive effect element, and composed of four magnetoresistive patterns 41 to 44 having an elongated shape to detect a component of a magnitude of a magnetic field that is mutually shifted by 90° un electrical angle in the phase of the rotation of the rotation axis L. An electrical angle will be described later. The magnetoresistive patterns 41 to 44 are arranged in a fan shape separated by 45° around the rotation axis. The magnetoresistive patterns 41 and 43 correspond to the phase A1 and are connected in parallel between the power supply voltage Vcc and the ground potential GND to constitute a bridge circuit as shown in FIG. 3A so that a differential output expressed by ±a from each midpoint can be obtained. Similarly, the resistance patterns 42 and 44 correspond to the phase B1 and are concatenated in parallel between the power supply voltage Vcc and the ground potential GND to constitute a bridge circuit as shown in FIG. 3B so that a differential output expressed by ±b from each midpoint can be obtained. As described above, in the first sensor unit 1a, a pair of N pole and S pole is used as the first magnet 20, so the first sensor unit 1a is also referred to as a 1-division sensor unit.

As will be described later, in the rotary encoder, the phase A1 and the phase B1 change sinusoidally by two cycles while the rotating body 2 actually makes one rotation. Therefore, in the rotary encoder, the actual rotation angle (angle geometrically or mechanically taken) of the rotating body 2 is called a mechanical angle, and the angle determined from the phase of the signal from the magnetosensitive element is called an electrical angle. In the case of using an element that can detect only a magnitude of a magnetic field and cannot detect a polarity of a magnetic field, the electrical angle is expressed as a value twice the mechanical angle. Since the magnetoresistive patterns 41 and 43 corresponding to the phase A1 and the magnetoresistive patterns 42 and 44 corresponding to the phase B1 are shifted to generate a phase difference of 90° in electrical angle, the phase A1 corresponds to a sine component (sin), and the phase B1 corresponds to a cosine component (cos). The magnetoresistive patterns 41 and 43 respectively correspond to (sin−) and (sin +) components having a phase difference of 180° in electrical angle, and the magnetoresistive patterns 42 and 44 respectively correspond to (cos−) and (cos +) components having a phase difference of 180°.

In the second sensor unit 1b, the second magnet 30 provided in the rotating body 2 is annular coaxial with the rotation axis L, and is provided to be spaced away from the first magnet 20 outside in the radial direction. The second magnet 30 includes two annular tracks 31, 32 composed of annular magnetized surfaces in which N poles and S poles are alternately magnetized at equal intervals in the circumferential direction, and these tracks 31, 32 are mutually contacted in the radial direction. Between the inner track 31 and the outer track 32, the N pole and the S pole are shifted by one pole in the circumferential direction. As a result, assuming a pole pair in which N poles and S poles are arranged in the radial direction as viewed from the rotation axis L, in the second magnet 30, a plurality of pole pairs are annularly arranged so that the orientations of the N pole and the S pole are opposite between adjacent pole pairs. Assuming that n-number of (n is an integer of 2 or more) N poles and n-number of S poles are provided as magnetized surfaces for each of the tracks 31 and 32, the number of pole pairs is 2n. The number 2 n of pole pairs is 16 in FIG. 1 for explanation, but in practice it is 128, for example. The second magnetosensitive element 60 provided in the fixed body 1 is constituted by, for example, a magnetoresistive effect element, and arranged corresponding to a position where the tracks 31, 32 are in contact with each other, to be faced to the magnetized surface of the second magnet 30. The intensity of the magnetic field by the second magnet 30 changes in a sinusoidal shape in the circumferential direction along the position where the tracks 31 and 32 contact each other with the length of one pole of N pole or S pole (2.8125° in mechanical angle because 360/128=2.8125 if the pole pair number is 128) as a cycle. Therefore, regarding the second magnet 30, the length of one pole of N pole or S pole corresponds to 360° in electrical angle. Since the second sensor unit 1b is provided with a plurality of pairs of the N pole and S pole as the second magnet 30, the second sensor unit 1b is also referred to as a multi-division sensor unit.

In the second magnetosensitive element 60, four magnetoresistive patterns 61 to 64 are arranged along the circumferential direction at an interval of ¼ of the length of one pole in the circumferential direction. Each of the magnetoresistive patterns 61 to 64 has an elongated shape extending in the radial direction of the rotating body 2. The second magnetosensitive element 60 is provided corresponding to the second magnet 30 so that the center of the second magnetosensitive element 60 is located above the position where the tracks 31 and 32 contact each other. In the second magnetosensitive element 60, similarly to the first magnetosensitive element 40, a magnetoresistive pattern of phase A2 (sin) and a magnetoresistive pattern of phase B2 (cos) having a phase difference of 90° in electrical angle with respect to the phase of the second magnet 30 are formed by the magnetoresistive patterns 61 to 64. The magnetoresistive pattern of the phase A2 consists of a (sin +) component magnetoresistive pattern 64 and a (sin−) component magnetoresistive pattern 62. The magnetoresistive pattern of the phase B2 consists of a (cos +) component magnetoresistive pattern 63 and a (cos−) component magnetoresistive pattern 61. As in the first magnetosensitive element 40, the magnetoresistive patterns 62 and 64 of the phase A2 constitute a bridge circuit shown in FIG. 3A, and the magnetoresistive patterns 61 and 63 of the phase B2 constitute a bridge circuit shown in FIG. 3B. Although the inner track 31 and the outer track 32 are provided here, only one of the tracks may be provided, and the second magnetosensitive element 60 may be disposed corresponding to the center position of the track. Even in such arrangement, the absolute angular position calculation procedure in the present embodiment can be applied as it is.

In the rotary encoder of the present embodiment, in order to detect the absolute angular position of the rotating body 2 at multiple rotations, the outputs of the first magnetosensitive element 40, the second magnetosensitive element 60 and the Hall elements 51, 52 are supplied to the data processing unit 70 as a processing circuit. In FIG. 1, the signal lines of the sin component and the cos component of each of the first magnetosensitive element 40 and the second magnetosensitive element 60 are indicated by one line, but actually, each signal line is a differential signal line as is apparent from the equivalent circuit diagram of FIG. 3A & FIG. 3B. The data processing unit 70 is provided with comparators 71 and 72, which receive the outputs of the first and second Hall elements 51, 52 and output the directions of the magnetic field detected by the Hall elements 51, 52 as binary signals of H/L, A/D converters 73 and 74, which receive the cos component and the sin component of the first magnetosensitive element 40 and perform analog/digital (A/D) conversion, comparators 81 and 82, which receive the cos component and the sin component of the second magnetosensitive element 60 and discriminate positive and negative polarities of the components, and A/D converters 83 and 84, which receive the cos component and the sin component of the second magnetosensitive element 60 and perform analog/digital (A/D) conversion. Further, the data processing unit 70 is provided with an arithmetic unit 75 for performing an arctangent ($\tan^{-1}$) calculation based on the outputs of the A/D converters 73 and 74, an arithmetic unit 85 for performing an arctangent ($\tan^{-1}$) calculation based on the outputs of the A/D converters 83 and 84, an initial coordinate calculation unit 76 for calculating an absolute position angle at the time of startup of the rotary encoder based on the outputs of the comparators 71, 72, 81, 82 and the outputs of the arithmetic units 75, 85, a counter setting unit 77, a QEP counter 86 which uses the outputs of the comparators 81, 82 as a QEP signal to be described later and performs calculation based on the QEP signal, and an absolute angular position calculation unit 87, which calculates and outputs the absolute angular position at multiple rotations based on the counted value at the QEP counter 86 and the calculation result in the arithmetic unit 85, when an angle request is input from the outside. The counter setting unit 77 sets an initial value of the count in the QEP counter 86 based on the calculation result in the initial coordinate calculation unit 76. In the present embodiment, in order to increase the processing speed, the initial coordinate calculation unit 76, the counter setting unit 77, the QEP counter 86 and the absolute angular position calculation unit 87 execute integer calculation (or fixed point calculation).

In the data processing unit 70, each of the comparators 71, 72, 81, 82, the A/D converters 73, 74, 83, 84, the arithmetic units 75, 85, the initial coordinate calculation unit 76, the counter setting unit 77, the QEP counter 86, and the absolute angular position calculation unit 87 may be provided as a hardware circuit component. Alternatively, the arithmetic units 75 and 85, the initial coordinate calculation unit 76, the counter setting unit 77, the QEP counter 86 and the absolute angular position calculation unit 87 are provided as a microprocessor or CPU, and the comparators 71, 72, 81, 82 and the A/D converters 73, 74, 83, 84 may be provided as a hardware circuit connected to the microprocessor. When a microprocessor (or a CPU) having a comparator function and an A/D function can be used, the entire data processing unit may be configured as a microprocessor or a CPU.

Figure 4A:
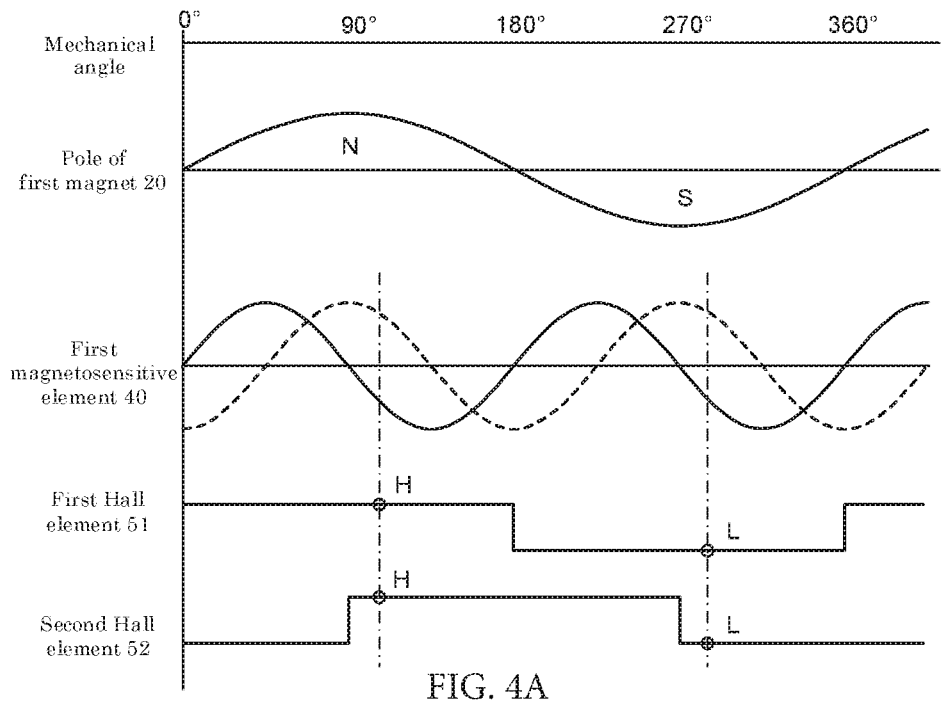
FIG. 4A and FIG. 4B are a diagram for explaining the operation principle of a rotary encoder.
Figure 4B:
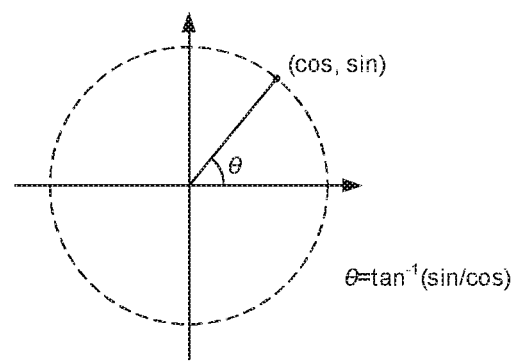

Next, the detection principle of the rotary encoder of the present embodiment will be described with reference to FIG. 4A & FIG. 4B. FIG. 4A, regarding the first sensor unit 1a and considering one point in the fixed body 1, shows how the polarity and intensity of the magnetic field formed by the first magnet 20, the outputs (sin and cos) from the first magnetosensitive element 40, and the first and second Hall elements 51, 52 changes with respect to a change in the mechanical angle of the rotating body 2. However, in the following description, the outputs of the first and second Hall elements 51 and 52 are indicated by H or L binary signals obtained via the comparators 71 and 72. As shown in the figure, when the rotating body 2 rotates and the first magnet 20 makes one rotation (360°) in mechanical angle, the sinusoidal signals sin and cos are output from the first magnetosensitive element 40 for two cycles, that is, by 720° in electrical angle. Assuming that the electrical angle is 0, as shown in FIG. 4B, by calculating $\theta=\tan^{-1}$ (sin/cos) according to these signals, sin and cos, the angular position of the rotating body 2 can be determined as an electrical angle $\theta$. However, in the example described here, since a magnetoresistive element is used and an electrical angle makes two rotations during one rotation of a mechanical angle, the absolute angular position cannot be obtained only by this $\theta$. Therefore, first and second Hall elements 51 and 52 provided at 90° apart from each other as viewed from the center of the first magnet 20 are used. According to the first and second Hall elements 51 and 52, since the polarity of the magnetic field generated by the first magnet 20 is discriminated, and as indicated by a one-dot chain line in FIG. 4A, it is known in which quadrant in the plane coordinate system the rotation angle by the mechanical angle is located, it is possible to obtain the absolute angular position by the mechanical angle of the rotating body 2. Also, since the signals of the first and second Hall elements 51 and 52 do not change at the same time, if counting is performed by adding 1 each time the signal changes in either of them, it is possible to obtain multi-rotation data in units of quadrants (90°) at a mechanical angle. Such multi-rotation data is referred to as Hall count multi-rotation data.

For the second sensor unit 1b, if the lengths of two adjacent pole pairs in the second magnet 30 in the circumferential direction are considered as two rotations (720°) in electrical angle, similarly to the case of the above-described first sensor unit 1a, it is possible to determine the absolute angular position (here, the position in the circumferential direction in two adjacent poles in the circumferential direction under consideration). For the two rotations, the sinusoidal waveforms of sin and cos also change by two rotations in electrical angle. Since the second sensor unit 1b is a multi-division sensor unit, the absolute angular position can be determined with higher resolution than the first sensor unit 1a. Therefore, by combining the rough absolute angular position by the first sensor unit 1a and the fine absolute angular position by the second sensor unit 1b, it is possible to determine the absolute angular position with high resolution as a whole. Since the rough absolute angular position can be found from the result of the first sensor unit 1a, in the second sensor unit 1b, it is unnecessary to provide a member equivalent to the first and second Hall elements 51 and 52 in the first sensor unit 1a.

In the above explanation, the arithmetic units 75 and 85 perform arctangent calculation ($\tan^{-1}$ (sin/cos)). In the arctangent calculation here, if the cos component is 0, it results in division by zero and the calculation is impossible, and if the cos component is close to 0, a calculation error increases. In such a case, as is well known, the rotation angle $\theta$ can be obtained by performing arc cotangent ($\cot^{-1}$ or arc cot) calculation and subtracting the obtained value from 90°. In general, a value range of an arctangent function (cot) is −90°<$\theta$<+90°. However, in the present embodiment, considering the signs of sin and cos, the rotation angle $\theta$ is obtained in the range of 0°≤$\theta$<360°. In this specification, arctangent calculation means to obtain $\theta$ in the range of 0°≤$\theta$<360°, including the arc cotangent calculation to be performed when the cos component is close to 0 as in such a case. In addition, one rotation of mechanical angle corresponds to two rotations of electrical angle, because of using a sensor that can detect an intensity of a magnetic field but cannot discriminate a polarity of a magnetic field. In the first magnetosensitive element 40, when using an element, such as a Hall element or the like that can detect an intensity of a magnetic field and can detect a polarity of the magnetic field at the same time and signs of an output is determined depending on a polarity of a magnetic field, as will be appreciated by those skilled in the art, the above description needs to be modified to that one rotation of mechanical angle corresponds one rotation of electrical angle. In this case, it is unnecessary to provide the first and second Hall elements 51 and 52 being provided separately for determining a quadrant of a rotation angle. Further, when a Hall element or the like is used in the second magnetosensitive element 60, the length of two pole pairs adjacent in the circumferential direction is regarded as one rotation (360°) in electrical angle.

Next, the processing in the rotary encoder of this embodiment will be described. In this rotary encoder, an absolute angular position based on the first sensor unit 1*a* is determined by the A/D converters 73, 74 and the arithmetic unit 75, and based on the determined absolute angular position and the results obtained by the A/D converters 83, 84 and the arithmetic unit 85, a final absolute angular position with high resolution can be obtained. However, since the process of A/D conversion and arctangent calculation in each arithmetic unit 75, 85 require increased processing time and processing load, it may be preferable not to do them as much as possible. Therefore, in the rotary encoder of the present embodiment, after calculating an absolute angular position with high resolution at the time of startup (or when specified), the cos and sin components from the second magnetosensitive element 60 of the second sensor unit 1*b* are processed by the comparators 81 and 82 to generate a QEP (Quadrature Encoder Pulse) signal, and only the QEP signal is counted. Then, when there is an angle request from the outside, an absolute angular position is calculated based only on the second sensor unit 1*b*, and this is combined with the count value of the QEP signal to obtain final multi-rotation absolute angular position data. In such operation, the A/D converters 73, 74 related to the first sensor unit 1*a* and the arithmetic unit 75 are used only at the time of startup. In the following description, it is assumed that the number 2n of pole pairs is 128, but one skilled in the art can understand the processing when the number of pole pairs is other than 128 from the following explanation.

Figure 5:
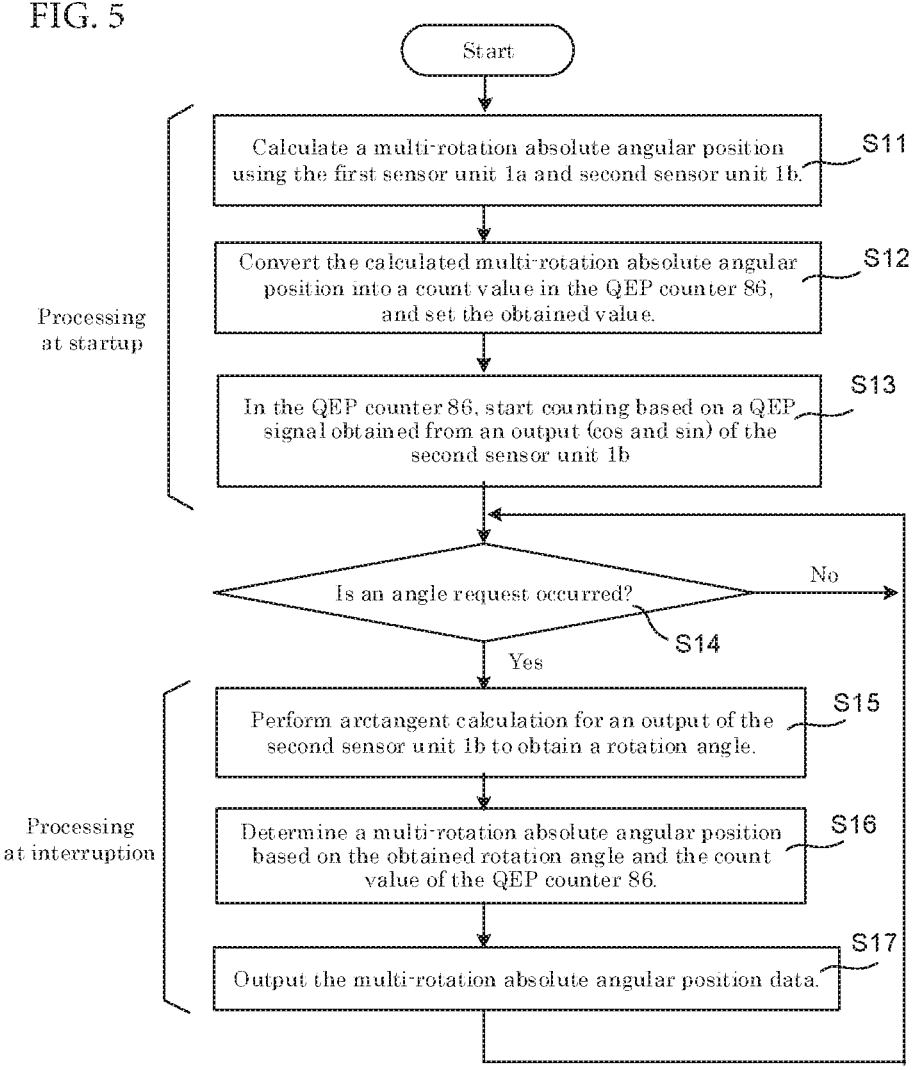
FIG. 5 is a flowchart showing the operation of a rotary encoder.

FIG. 5 is a flowchart for explaining the operation in this embodiment. When the rotary encoder is started, first in S11, the A/D converters 73, 74, 83, 84 and the arithmetic units 75, 85 are operated, angular position calculation is performed based on the signals of the cos and sin components from each of the first sensor unit 1*a* and the second sensor unit 1*b*, and based on the results obtained from them and the results of the first and second Hall elements 51 and 52, the initial coordinate calculation unit 76 determines an initial value of a multi-rotation absolute angular position. Next, in S12, the counter setting unit 77 converts the obtained multi-rotation absolute angular position into the count value in the QEP counter 86, and supplies the value obtained by the conversion to the QEP counter 86 as an initial value that is a start value of counting. Thereafter, in S13, counting by the QEP signal is started based on the outputs (cos and sin) of the second sensor unit 1*b* in the QEP counter 86.

Here, the QEP signal will be described. The QEP signal is a pulse for counting generated from the output of the second sensor unit 1*b*. The signs of cos and sin components obtained from the second magnetosensitive element 60 of the second sensor unit 1*b* are reversed each time an electrical angle in the second sensor unit 1*b* is changed by 180°, and the signs of both components are shifted by 90° in electrical angle. If 1 is added to or subtracted from the count value of the QEP counter 86 each time the sign of either cos or sin is reversed, the count value changes by 4 every electrical angle of 360°. Whether to perform addition or subtraction depends on whether the rotating body 2 rotates in the forward direction or in the reverse direction. Assuming that the binary signal (H or L signal) output from the comparators 81 and 82 are Qc and Qs, respectively, the QEP signal can be represented as (Qc, Qs). If the rotating body 2 rotates in the forward direction, (Qc, Qs) changes as (H, L)→(H, H)→(L, H)→(L, L)→(H, L)→. On the other hand, if it rotates in the reverse direction, (Qc, Qs) changes (H, L)→(L, L)→(L, H)→(H, H)→(H, L)→. Therefore, by detecting how the QEP signal has changed from a certain point of time, the rotation direction of the rotating body 2 can be known. For example, assuming that (Q, Q) is (H, H), if it changes from this state to (L, H), then it is judged to be normal rotation, and if it changes to (H, L), it is judged to be reverse rotation. Since whether to add or subtract 1 is selected according to the forward rotation or reverse rotation, even if rotating in the reverse direction while rotating forward and then rotating forward, the absolute angular position of the rotation can be correctly obtained. Since the number 2n of pole pairs is 128, the count value of the QEP counter 86 changes by 512 (=4×128) with one mechanical angle rotation. The remainder obtained by dividing the value of the QEP counter 86 by 512 means that the pole pair of the second magnet 30 to which the mechanical angle at that point corresponds is indicated by 2 bits per a pole pair. By continuing the counting in the QEP counter 86, multi-rotation data can be obtained. This multi-rotation data is data indicating the absolute angular rotation position considering the rotation direction.

While counting the accumulation by the QEP counter 86, whether or not an interruption of angle request occurs is judged in S14, and if the interruption does not occur, the process returns to S14 to wait for the interruption. If the interruption of angle request occurs, in S15, the A/D converters 83, 84 of the second sensor unit 1*b* and the arithmetic unit 85 are operated, and arctangent calculation is performed for the output of the second magnetosensitive element 60 of the second sensor unit 1*b* to obtain the rotation angle. In S16, the absolute angular position calculation unit 87 obtains the multi-rotation absolute angular position based on the obtained rotation angle and the count value of the QEP counter 86 at this time, and outputs the absolute angular position data in S17. Since this absolute angular position data is based on the detection result by the second sensor unit 1*b*, it has sufficient resolution. In addition, since the accumulation has been continued by the QEP counter 86, it is also multi-rotation data. Thereafter, the process returns to S14 to prepare for the next angle request.

In the process shown in FIG. 5, in S11, the multi-rotation absolute angular position data is generated by combining the result of the quadrant of the rotation angle obtained from the Hall elements 51 and 52, the result of angle calculation relating to the first sensor unit 1*a* obtained from the arithmetic unit 75, and the result of angle calculation relating to the second sensor unit 1*b* obtained from the arithmetic unit 85. At this time, it is impossible to generate accurate multi-rotation absolute angular position data unless the timing of determining that the quadrant of the rotation angle has been switched by the result from the Hall elements 51 and 52 coincides with the timing when the angle is 0°, 90°, 180° or 270° in the result of angle calculation relating to the first sensor unit 1*a*. Similarly, in order to obtain accurate multi-rotation absolute angular position data, the result of angle calculation relating to the second sensor unit 1*b* must be 0° at the timing when the angle is 0°, 90°, 180° or 270° in the result of angle calculation relating to the first sensor unit 1*a*. However, due to the mounting accuracy of the Hall elements 51, 52, the first magnetosensitive element 40 and the second magnetosensitive element 60, the coincidence of these timings is not necessarily ensured.

Therefore, in the present embodiment, with respect to the first sensor unit 1*a*, phase matching calculation (phase matching A) is executed for compensating for the phase shift between the results from the Hall elements 51 and 52 and the result from the first magnetosensitive element 40). Further, phase matching calculation (referred to as phase matching B) is executed for matching the phase between the data obtained by the phase matching A and the result of the angle calculation based on the output of the second sensor unit 1*b*. Similarly, in S12, the count value of the QEP signal is combined with the result of the angle calculation based on the output of the second sensor unit 1*b*. The QEP signal is also based on the output of the second sensor unit 1*b*. However, the processing speeds of the comparators 81 and 82 used for obtaining the QEP signal are different from the processing speeds of the A/D converters 83 and 84 used for obtaining the angle calculation result and the arithmetic operation unit 85. The zero point potential and the like in these elements may include an error. Thus, a phase shift may occur due to the difference. Therefore, phase matching calculation (referred to as phase matching C) is also executed for matching the phase between the count value of the QEP signal and the angle calculation based on the output of the second sensor unit 1*b*. In S16, as well, the count value of the QEP counter 86 is combined with the result of the angle calculation based on the output of the second sensor unit 1*b*. However, a phase shift may also occur here, and phase matching calculation (referred to as phase matching D) is executed.

Figure 6:
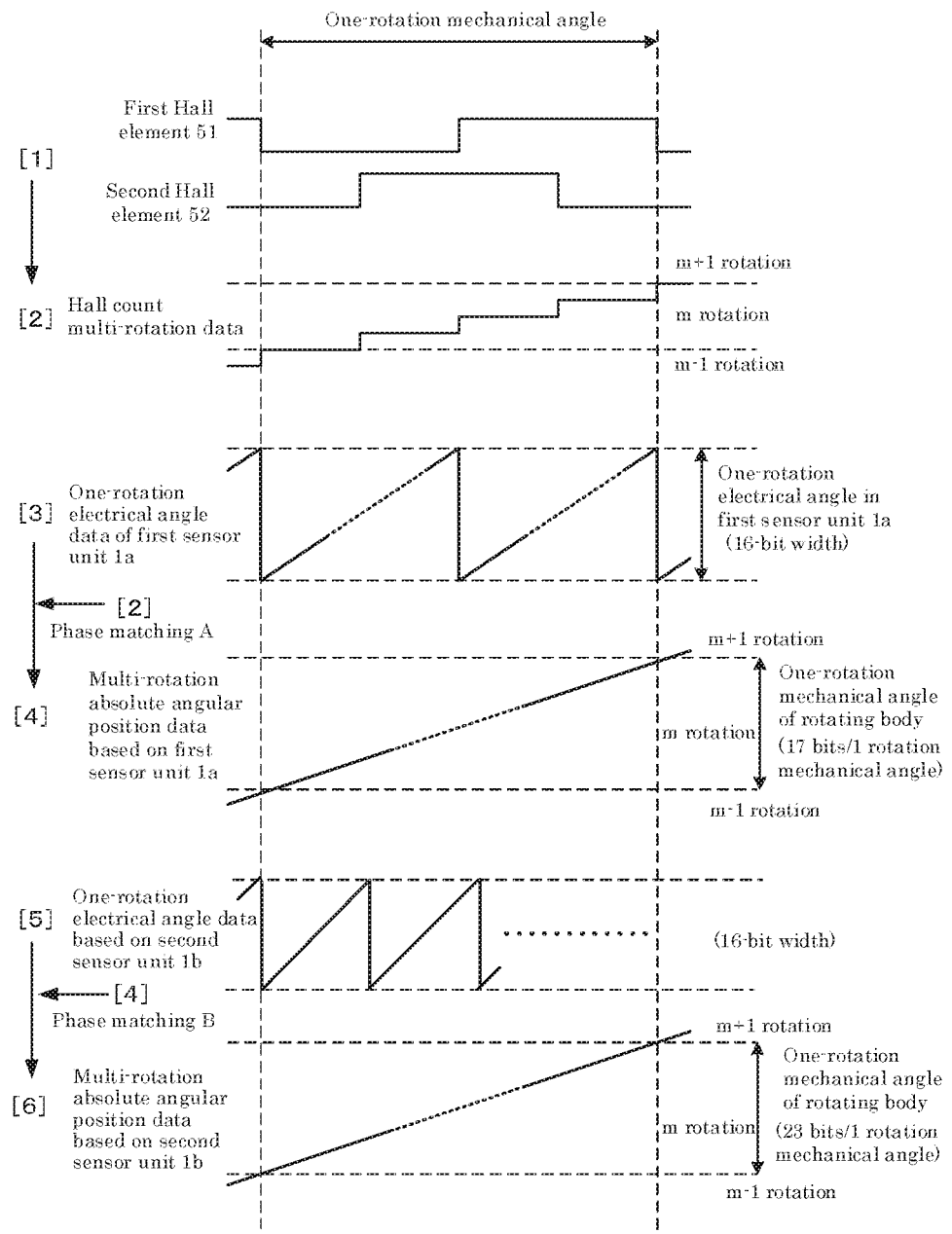
FIG. 6 is a diagram explaining a method of determining an absolute angular position.
Figure 7:
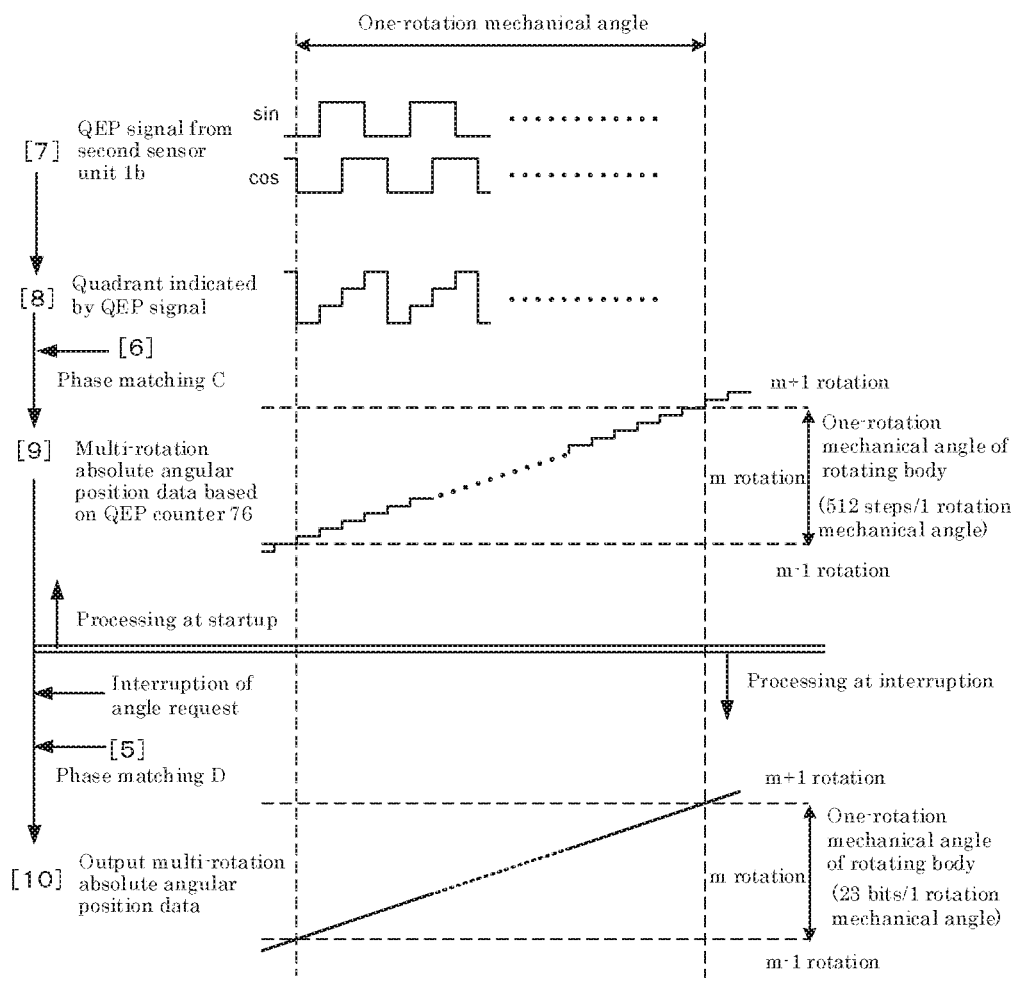
FIG. 7 is a diagram explaining a method of determining an absolute angular position.
Figure 8:
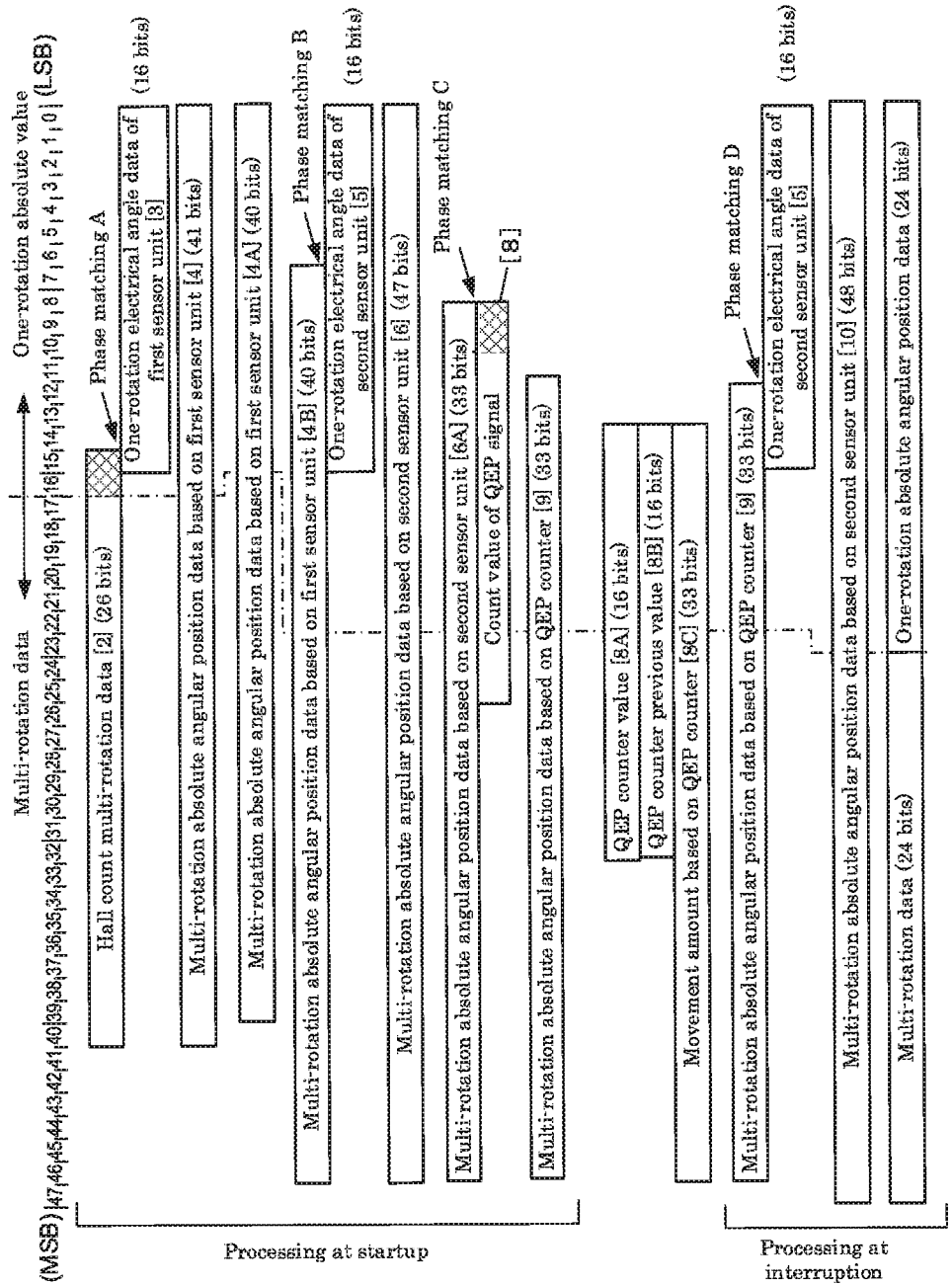
FIG. 8 is a diagram showing a data format of each data and a relationship between them.

The above operation, including the phase matching calculation, will be described in further detail with reference to FIG. 6 to FIG. 13. FIG. 6 and FIG. 7 show changes in each data and each signal with respect to a change in mechanical angle. FIG. 8 shows the format of each data and the relationship between these data, assuming that the process proceeds from the top to bottom in the drawing. In FIG. 8, among the data, the boundary between the portion corresponding to the multi-rotation data and the portion corresponding to the data of the one-rotation absolute value is indicated by a one-dot chain line. Here, assuming that the number 2n of pole pairs is 128 ($=2^7$), 24 bits on the MSB (most significant bit) side are multi-rotation data, and 24 bits on the LSB (least significant) side are one-rotation absolute angular position data, it is aimed to obtain multi-rotation absolute angular position data of 48 bits in total. In the following description, assuming that each data is obtained by unsigned integer type calculation, and it is assumed that the LSB is the 0th bit, the MSB is the 47th bit, and the outputs of the arithmetic units 75 and 85 are all 16-bit wide. However, when obtaining a difference between data, the difference is assumed to be represented by a signed integer.

In FIG. 6, [1] shows changes in the outputs of the first and second Hall elements 51 and 52. The outputs of the Hall elements 51 and 52 are changed every 180° of mechanical angle, and have a phase difference of 90° with each other. Assuming that the outputs of the Hall elements 51 and 52 are Hc and Hs, respectively, the form of the change of (Hc, Hs) differs according to the rotation direction of the rotating body 2 similar to the above QEP signal (Qc, Qs). Therefore, based on the outputs of the Hall elements 51 and 52, the counting is performed to add or subtract 1 according to the rotation direction when the output of any one of the Hall elements 51 and 52 changes, thereby obtaining the Hall count multi-rotation data shown in [2]. The Hall count multi-rotation data is also data corresponding to the absolute angular position of rotation. In FIG. 6, as multi-rotation data, a change in the data of the m-th rotation (m rotation) is shown. As shown in FIG. 8, the Hall count multi-rotation data [2] has a data length of 26 bits, the upper 24 bits of which are multi-rotation data by the count of the Hall elements 51 and 52, and the lower 2 bits (hatched portions in FIG. 8) are Hall counts representing the quadrants of the rotation angle. On the other hand, one-rotation electrical angle data of 16 bits shown in [3] is obtained by the arithmetic unit 75 performing arctangent calculation on the output of the first magnetosensitive element 40 of the first sensor unit 1*a*. The one-rotation electrical angle data is data indicating a rotation angle and is data to be returned to original by one rotation of electrical angle (data not including a cumulative number of rotations). In this case, since one rotation of mechanical angle corresponds to two rotations of electrical angle, it can be said that the one-rotation electrical angle data is incremental angle data having two cycles for one rotation of mechanical angle. In the present embodiment, by combining the Hall count multi-rotation data [2] and the one-rotation electrical angle data [3], it is possible to obtain 41-bit length multi-rotation absolute angular position data shown in [4] (also referred to as first multi-rotation absolute angular position data) based on the first sensor unit 1*a* (that is, a 1-division sensor unit). At this time, the calculation of phase matching A is performed as described above.

Figures 9A, 9B:
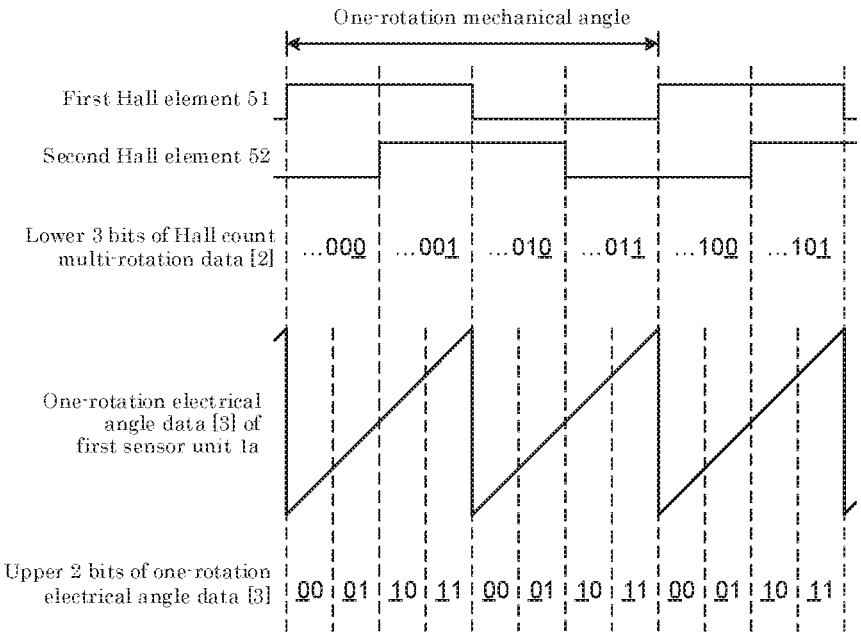
FIG. 9A and FIG. 9B are a diagram explaining phase matching calculation A.

The calculation of phase matching A that is preliminary phase matching will be described with reference to FIG. 9A & FIG. 9B. FIG. 9A is a diagram for explaining the principle of phase matching A by showing a change in each data along with a change in mechanical angle. FIG. 9B shows the contents of a correction value table used for the phase matching A. The correction value table is provided in the initial coordinate calculation unit 76. As shown in FIG. 9A, when the Hall count multi-rotation data [2] is generated based on the outputs from the Hall elements 51 and 52, the lower two bits of the data [2] change from "00"→"01"→"10"→"11" within the period of one rotation of mechanical angle. On the other hand, since the one-rotation electrical angle data [3] of the first sensor unit 1*a* output from the arithmetic unit 75 makes two rotations during one rotation of mechanical angle, its most significant bit changes from "0"→"1"→"0"→"1" within the period of one rotation of mechanical angle. Here, comparing the Hall count multi-rotation data [2] with the one-rotation electrical angle data [3], if the timings of both data are coincident, the least significant bit of the Hall count multi-rotation data [2] (the bit underlined in FIG. 9A & FIG. 9B) always coincides with the most significant bit of the one-rotation electrical angle data [3] (the bit underlined in FIG. 9A & FIG. 9B). Contrarily, if the least significant bit of the Hall count multi-rotation data [2] does not coincide with the most significant bit of the one-rotation electrical angle data [3], it is necessary to perform phase matching calculation between them.

In the present embodiment, the phase matching A is executed by correcting the Hall count multi-rotation data [2] on the assumption that the one-rotation electrical angle data [3] is correct. For that purpose, it is necessary to determine whether the Hall count multi-rotation data [2] is advanced or delayed with respect to the one-rotation electrical angle data [3]. If the least significant bit of the Hall count multi-rotation data [2] changes from "0" to "1" earlier than the one-rotation data [3], as shown in FIG. 9B, the upper two bits of the one-rotation data [3] are "01" at this point in time. Contrarily, if the multi-rotation data [2] changes from "0" to "1" later than the one-rotation data [3], the upper two bits of the one-rotation data [3] are "10". The same consideration is made when the least significant bit of the Hall count multi-rotation data [2] changes from "1" to "0". When the least significant bit of the Hall count multi-rotation data [2] does not coincide with the most significant bit of the one-rotation electrical angle data [3], it is sufficient to add 1 to or subtract 1 from the Hall count multi-rotation data [2] according to the correction value table shown in FIG. 9B. In practice, if the second bit from the top of the one-rotation electrical angle data [3] is "0", "1" is added, and if it is "1", "1" is subtracted. After the phase matching A is performed in this manner, the least significant bit of the Hall count multi-rotation data [2] is removed, and the one-rotation electrical angle data [3] is concatenated to the lower bit side of the remaining 25-bit Hall count multi-rotation data [2], then the 41-bit multi-rotation absolute angular position data [4] based on the first sensor unit 1a can be obtained.

On the other hand, by the arithmetic unit 85 performing arctangent calculation on the output of the second magnetosensitive element 60 of the second sensor unit 1b, it is possible to obtain the 16-bit one-rotation electrical angle data [5] rotating once in the circumferential length of one pole pair. Since the number of pole pairs is 128, the one-rotation electrical angle data [5] has 128 cycles within the range of one mechanical angle. By combining the one-rotation electrical angle data [5] with the multi-rotation absolute angular position data [4] based on the first sensor unit 1a, while performing the calculation of the phase matching B, it is possible to obtain the 47-bit multi-rotation absolute angular position data (second multi-rotation absolute angular position data) based on the second sensor unit 1b shown in [6]. In this case, first, for the calculation of the phase matching B, the 41-bit multi-rotation absolute angular position data [4] is shifted one bit to the right to obtain 40-bit multi-rotation absolute angular position data [4A]. Then, to match the scales on the mechanical angle, the multi-rotation absolute angular position data [4A] is multiplied by 128 (actually, shifted to the left by 7 bits) to obtain multi-rotation absolute angular position data [4B]. While performing the phase matching B in this state, the multi-rotation absolute angular position data [4B] is combined with the one-rotation electrical angle data [5].

The phase matching B that is the first phase matching will be described. FIG. 10 shows a correction value table stored in the initial coordinate calculation unit 76 and used for the phase matching B. The purpose of the phase matching here is matching between the data from the first sensor unit 1a and the data from the second sensor unit 1b, based on the one-rotation electrical angle data [5], which is based on the second sensor unit 1b. First, the upper 9 bits of the one-rotation electrical angle data [5] is subtracted from the lower 9 bits of the multi-rotation absolute angular position data [4B] to obtain the difference. These 9 bits are the bits overlapping between the multi-rotation absolute angular position data [4B] and the one-rotation electrical angle data [5] with respect to the angle of the rotating body 2. The difference lies between −511 and +511 in decimal notation. Then, as shown in the correction value table of FIG. 10, the correction value is set to 0 when the difference is −223 to +223, the correction value is set to −1 when the difference is −511 to −289, and the correction value is set to +1 when the difference is +289 to +511. If the difference is any other value, that is, −288 to −224 or +224 to +228, an error is assumed. In the case of error, the process is terminated. One rotation of electrical angle in the second sensor unit 1b is about 2.8° in mechanical angle, and a considerable phase difference range is ± about 1.4°. However, in this case, the phase difference is allowed to be up to ±1°, and more than that is regarded as an error. The correction value of +1 indicates that the multi-rotation absolute angular position data [4B] based on the first sensor unit 1a is delayed with respect to the one-rotation electrical angle data [5] of the second sensor unit 1b, and the correction value of −1 indicates that it is advanced. Thereafter, the low-order 9 bits of the multi-rotation absolute angular position data [4B] are masked with 0, and the one-rotation electrical angle data [5] is added so that the low-order 9 bits correspond to the upper 9 bits of the one-rotation electrical angle data. Further, in order to compensate for the phase shift derived from the multi-rotation absolute angular position data [4 B], 65536 (=$2^{16}$) is added if the correction value is +1, and 65536 is subtracted if the correction value is −1, to obtain the multi-rotation absolute angular position data [6] based on the second sensor unit 1b. In this case, the multi-rotation absolute angular position data [4B] with 9 bits overlapped is concatenated to the one-rotation electrical angle data [5]. The multi-rotation absolute angular position data [6] has higher resolution than the multi-rotation absolute angular position data [4] based on the first sensor unit 1b. The process until obtaining the multi-rotation absolute angular position data [6] is the process in S11 in FIG. 5.

In FIG. 7, [7] shows a QEP signal obtained by the comparators 81 and 82 discriminating the polarities of the cos component and the sin component from the second magnetosensitive element 60 of the second sensor unit 1b. As described above, this QEP signal is a pair of signals whose phases are mutually shifted by 90° and reversed every 180° as expressed by the electrical angle of the second sensor unit 1b. Assuming that counting is performed to add or subtract 1 according to the rotation direction at the timing when the sign of either the cos component or the sin component in the QEP signal changes, the lower 2 bits (hatched portions in FIG. 8) indicate the quadrant at the electrical angle of the second sensor unit 1b as shown in [8]. Of the count value from the QEP signal, the lower two bits [8] representing the quadrant is combined with the multi-rotation absolute angular position data [6] based on the second sensor unit 1b, and the calculation of the phase matching C is performed to obtain the multi-rotation absolute angular position data (third multi-rotation absolute angular position data) shown in [9], which changes stepwise every 90° electrical angle in the second sensor unit 1b. This multi-rotation absolute angular position data [9] is the data, which changes whenever 1 is added to or subtracted from the count value of the QEP counter 86, and is referred to as multi-rotation absolute angular position data based on the QEP counter 86.

The calculation of the phase matching C that is the second phase matching will be described. FIG. 11 shows a correction value table stored in the counter setting unit 77 and used for the phase matching C. The phase matching C is a process of matching the phase of the multi-rotation absolute angular position data [6] based on the second sensor unit 1b with respect to the quadrant data [8] determined based on the QEP signal. The lower 2 bits of the multi-rotation absolute angular position data [6] are subtracted from the 2-bit data [8] representing the quadrant. As shown in the correction value table of FIG. 11, the correction value is set to 0 if the difference is −1 to +1, the correction value is set to −1 if the difference is +3, and the correction value is set to +1 if the difference is −3. When the difference is +2 or −2, an error is assumed because it indicates that the phases of both are shifted almost opposite to each other. In the case of error, the process is terminated. The correction value of +1 indicates that the quadrant data [8] from the QEP signal is advanced, and the correction value of −1 indicates that the phase of the multi-rotation absolute angular position data [6] is advanced. After obtaining the correction value, the correction value is added to the multi-rotation absolute angular position data [6] to obtain the multi-rotation absolute angular position data [9] based on the QEP counter 86.

Next, in S12 (FIG. 5), the counter setting unit 77 sets the multi-rotation absolute angular position data [9] based on the QEP counter 86 in the QEP counter 86 as an initial value. Thereafter, the QEP counter 86 starts counting based on the QEP signal (S13 in FIG. 5). The above is the startup operation in the rotary encoder of this embodiment.

The multi-rotation absolute angular position data [9] based on the QEP counter 86 is gradually increased by the counting operation of the QEP counter 86 in the normal case where the rotating body 2 rotates in the positive direction. In the example shown here, a 33-bit data width is reserved for the multi-rotation absolute angular position data [9], and the processing load may be increased when this data width is used for counting a QEP signal that may occur at a high frequency. Therefore, in the present embodiment, the QEP counter 86 is provided with a 16-bit width register for performing an actual counting operation (described as a QEP counter value [8A] in FIG. 8), a 16-bit width register for holding a previous count value [8B], and a memory for storing the movement amount [8C] based on the QEP counter. A difference between the QEP counter value [8A] and the previous value [8B] is calculated at an appropriate timing not to be affected by the overflow of the QEP counter value [8A]. The difference is accumulated as the movement amount [9] based on the QEP counter. The difference between the QEP counter value [8A] and the previous value [8B] is also calculated when an interruption of angle request occurs. Each time the difference is calculated, the previous value [8B] is updated with the QEP counter value [8A] at that time. In this configuration, by adding the multi-rotation absolute angular position data [9] set in the QEP counter 86 at the time of startup and the movement amount [8C] based on the QEP counter, the multi-rotation absolute angular position data [9] at that time can be obtained. Of course, when it is unnecessary to consider the processing load required for counting, in the QEP counter 86, a counting process may be performed to directly add or subtract 1 to or from the multi-rotation absolute angular position data [9] set during startup processing whenever the QEP signal changes.

When an interruption of angle request occurs, the A/D converters 83 and 84 and the arithmetic unit 85 are operated in S15 (FIG. 5) to obtain the one-rotation electrical angle data [5] of the second sensor unit 1b at the time of interruption, calculation of the phase matching D is executed in S16 (FIG. 5), and the one-rotation electrical angle data [5] is combined with the multi-rotation absolute angular position data [9] based on the QEP counter 86 at the time of interruption, thereby generating 48-bit multi-rotation absolute angular position data [10] (fourth multi-rotation absolute angular position data) to be output. The multi-rotation absolute angular position data [10] is output to the outside as a response to the angle request in S17 (FIG. 5). Here, although the multi-rotation absolute angular position data [10] is shown as the data that changes smoothly with respect to a mechanical angle, actually the multi-rotation absolute angular position data at the time of interruption is only calculated. In addition, the accuracy of the multi-rotation absolute angular position data in [10] is equivalent to the multi-rotation absolute angular position data shown in [6] based on the second sensor unit 1b.

Here, the calculation of the phase matching D will be described. FIG. 12 shows a correction value table stored in the absolute angular position calculation unit 87 and used for the phase matching D. The phase matching D is performed for matching the phase of the multi-rotation absolute angular position data [9] based on the QEP counter with respect to the one-rotation electrical angle data [5] based on the second sensor unit 1b. As described above, the lower two bits of the multi-rotation absolute angular position data [9] and the upper two bits of the one-rotation electrical angle data [5] represent the quadrants of the rotation angle detected by the second sensor unit 1b. In the phase matching D, the upper two bits taken out from the one-rotation electrical angle data [5] are subtracted from the lower 2 bits taken out from the multi-rotation absolute angular position data [9]. As shown in the correction value table of FIG. 12, the correction value is set to 0 if the difference is −1 to +1, the correction value is set to +1 if the difference is +3, and the correction value is set to −1 if the difference is −3. When the difference is +2 or −2, an error is assumed because it indicates that the phases of both are shifted almost opposite to each other. In the case of error, the process is terminated. The correction value of +1 indicates that the phase of the one-rotation electrical data [5] is advanced, and the correction value of −1 indicates that the multi-rotation absolute angular position data [9] is advanced. Thereafter, the lower 2 bits of the multi-rotation absolute angular position data [9] are masked with 0, and the one-rotation electrical angle data [5] is added. If the correction value is +1, 65536 is added, and if the correction value is −1, 65536 is subtracted. Here, the multi-rotation absolute angular position data [9] with 2 bits overlapped is concatenated to the one-rotation electrical angle data [5]. The multi-rotation absolute angular position data [10] to be output is generated by shifting the data obtained by such calculation to the left by one bit.

As described above, in the present embodiment, even when a phase shift occurs between the Hall elements 51, 52, the first magnetosensitive element 40 of the first sensor unit 1a, and the second magnetosensitive element 60 of the second sensor unit 1b due to a mounting accuracy or the like, or when a phase shift occurs between the QEP signal from the second sensor unit 1b and the one-rotation electrical angle data, these phase shifts can be eliminated by performing the phase matching A to D, and the absolute angular position of the rotating body 2 can be obtained with high accuracy while minimizing the number of executions of the A/D conversion and the arctangent calculation.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A rotary encoder for detecting an angle of a rotating body with respect to a fixed body, the rotary encoder comprising:
a first sensor unit comprising a first magnet with a pair of N pole and S pole magnetized, and a first magnetosensitive unit facing the first magnet and detecting a component of phase A1 and a component of phase B1 different from the phase A1;
a second sensor unit comprising a second magnet with a plurality of pairs of N poles and S poles alternately magnetized, and a second magnetosensitive unit facing the second magnet and detecting a component of phase A2 and a component of phase B2 different from the phase A2;
a circuit structured to generate pulses for counting from an output of the second sensor unit;
a counter structured to count the pulses;
a first arithmetic unit configured to calculate a first angle value based on an output of the first magnetosensitive unit; and
a second arithmetic unit configured to calculate a second angle value based on an output of the second magnetosensitive unit,
wherein one of the first magnet and the first magnetosensitive unit is provided in the fixed body and the other is provided in the rotating body, and one of the second magnet and the second magnetosensitive unit is provided in the fixed body and the other is provided in the rotating body,
and wherein, at the time of startup, first phase matching is performed for matching a phase between first multi-rotation absolute angular position data obtained from the first angle value and the second angle value, and the first multi-rotation absolute angular position data is concatenated to the second angle value, thereby generating second multi-rotation absolute angular position data,
second phase matching is performed for matching a phase of the second multi-rotation absolute position data based on a third angle value obtained by integrating the pulses for counting from an output of the second sensor unit, and third multi-rotation absolute angular position data is generated as an initial value, and
after the startup, the pulses are counted in the counter,
wherein the first magnetosensitive unit comprises a magnetoresistive effect element comprising a magnetoresistive pattern corresponding to the phase A1 and a magnetoresistive pattern corresponding to the phase B1, and a pair of Hall elements arranged at positions spaced by 90° as seen from a rotation axis of the rotating body,
at the time of startup, preliminary phase matching is performed for matching a phase between Hall count multi-rotation data counted based on combination of polarities of signals from the pair of Hall elements and the first angle value, and the Hall count multi-rotation absolute angular position data is concatenated to the first angle value to obtain the first multi-rotation absolute angular position data, and
wherein lower 2 bits of the Hall count multi-rotation data represent a quadrant of a rotation angle of the rotating body, and the preliminary phase matching is a process of manipulating at least a lowest bit of the Hall count multi-rotation data to match a quadrant of the rotation angle indicated in the first angle value.

2. The rotary encoder according to claim 1, wherein at the time of startup, a value obtained by converting the third multi-rotation absolute angular position data into a count value in the counter is stored in the counter as an initial value, and the counter performs counting with the stored value as the start value.

3. The rotary encoder according to claim 2, wherein when an angular position is requested, third phase matching is performed for matching a phase between the count value in the counter at the time of the request and the second angle value, and the count value and the second angle value are concatenated to generate fourth multi-rotation absolute angular position data.

4. The rotary encoder according to claim 3, wherein the third phase matching is a process performed by comparing bits of the third multi-rotation absolute angular position data with bits of the second angle value in a range overlapping with respect to the rotation angle, and removing the bits in the overlapping range from the third multi-rotation absolute angular position data, and making correction for the lower bits of the third multi-rotation absolute angular position data after removal of the bits according to the result of the comparison, and
the second angle value is concatenated to the third multi-rotation absolute angular position data after the correction to obtain the fourth multi-rotation absolute angular position data.

5. The rotary encoder according to claim 1, wherein the third multi-rotation absolute angular position data has a resolution corresponding to a quarter of a length of one cycle in an output of the second sensor unit.

6. The rotary encoder according to claim 5, wherein in the second phase matching, lower 2 bits of the third angle value represent a quadrant.

7. The rotary encoder according to claim 1, wherein the third multi-rotation absolute angular position data has a resolution corresponding to a quarter of a length of one cycle in an output of the second sensor unit.

8. The rotary encoder according to claim 1, wherein the first phase matching is a process of comparing bits of the first multi-rotation absolute angular position data with bits of the second angle value in a range overlapping with respect to the rotation angle, removing the bits in the overlapping range from the first multi-rotation absolute angular position data, and making correction for the lower bits of the first multi-rotation absolute angular position data after removal of the bits according to the result of the comparison, and
the second angle value is concatenated to the first multi-rotation absolute angular position data after the correction to obtain the second multi-rotation absolute angular position data.

9. The rotary encoder according to claim 1, wherein the first phase matching is a process of comparing bits of the first multi-rotation absolute angular position data with bits of the second angle value in a range overlapping with respect to the rotation angle, removing the bits in the overlapping range from the first multi-rotation absolute angular position data, and making correction for the lower bits of the first multi-rotation absolute angular position data after removal of the bits according to the result of the comparison, and
the second angle value is concatenated to the first multi-rotation absolute angular position data after the correction to obtain the second multi-rotation absolute angular position data.

10. An absolute angular position detection method for use with a rotary encoder, the rotary encoder comprising a first sensor unit and a second sensor unit, the first sensor unit includes a first magnet with a pair of N pole and S pole magnetized, and a first magnetosensitive unit facing the first magnet and detecting a component of phase A1 and a component of phase B1 different from the phase A1, and the second sensor unit includes a second magnet with a plurality of pairs of N poles and S poles alternately magnetized, and a second magnetosensitive unit facing the second magnet and detecting a component of phase A2 and a component of phase B2 different from the phase A2, the rotary encoder further comprising: a circuit for generating pulses for counting from an output of the second sensor unit; a counter for counting the pulses; a first arithmetic unit for calculating a first angle value based on an output of the first magnetosensitive unit; and a second arithmetic unit for calculating a second angle value based on an output of the second magnetosensitive unit, one of the first magnet and the first magnetosensitive unit is provided in the fixed body and the other is provided in the rotating body, and one of the second magnet and the second magnetosensitive unit is provided in the fixed body and the other is provided in the rotating body, the absolute angular position detection method comprising:

performing, at startup, first phase matching for matching a phase between first multi-rotation absolute angular position data obtained from the first angle value and the second angle value, and concatenating the first multi-rotation absolute angular position data and the second angle value, thereby generating second multi-rotation absolute angular position data;

performing second phase matching for matching a phase of the second multi-rotation absolute position data based on a third angle value obtained by integrating the pulses for counting from an output of the second sensor unit, and generating third multi-rotation absolute angular position data as an initial value; and starting counting by the counter for the pulses for counting generated from an output of the second sensor unit after the startup, wherein the first magnetosensitive unit comprises a magnetoresistive effect element comprising a magnetoresistive pattern corresponding to the phase A1 and a magnetoresistive pattern corresponding to the phase B1, and a pair of Hall elements arranged at positions spaced by 90° as seen from a rotation axis of the rotating body, at the time of startup, preliminary phase matching is performed for matching a phase between Hall count multi-rotation data counted based on combination of polarities of signals from the pair of Hall elements and the first angle value, and the Hall count multi-rotation absolute angular position data is concatenated to the first angle value to obtain the first multi-rotation absolute angular position data, and wherein lower 2 bits of the Hall count multi-rotation data represent a quadrant of a rotation angle of the rotating body, and the preliminary phase matching is a process of manipulating at least a lowest bit of the Hall count multi-rotation data to match a quadrant of the rotation angle indicated in the first angle value.

11. A method of detecting an absolute angular position according to claim 10, further comprising:

storing the value obtained by converting the third multi-rotation absolute angular position data into a count value in the counter in the counter as an initial value at the time of startup, and when an angular position is requested, third phase matching is performed for matching a phase between a count value in the counter at the time of the request and the second angle value, and the count value and the second angle value are concatenated to generate fourth multi-rotation absolute angular position data, wherein the counter performs counting with the stored value as a start value.

\* \* \* \* \*